United States Patent
Bossler

(12)
(10) Patent No.: US 6,357,434 B1
(45) Date of Patent: Mar. 19, 2002

(54) BARBECUE GRILL ADJUSTMENT MECHANISM

(75) Inventor: Martin C. Bossler, Spring Grove, IL (US)

(73) Assignee: Uniflame Corp, Zion, IL (US)

( * ) Notice: Subject to any disclaimer, the term of this patent is extended or adjusted under 35 U.S.C. 154(b) by 0 days.

(21) Appl. No.: 09/602,334

(22) Filed: Jun. 23, 2000

(51) Int. Cl.[7] ............................................... A47J 33/00
(52) U.S. Cl. ..................................... 126/25 A; 126/154
(58) Field of Search .......................... 126/25 A, 25 R, 126/9 R, 41 E, 9 B, 154, 153; 99/444, 449, 450

(56) References Cited

U.S. PATENT DOCUMENTS

| | | | |
|---|---|---|---|
| 1,102,392 A | * | 7/1914 | Denhard .................... 126/25 A |
| 1,694,211 A | | 12/1928 | Fernandez |
| 1,986,035 A | | 1/1935 | Wells |
| 2,047,979 A | * | 7/1936 | Mills ........................ 126/41 E |
| 2,455,154 A | | 11/1948 | Bailey |
| 2,573,115 A | * | 10/1951 | Sisto ........................ 126/25 A |
| 2,781,037 A | | 2/1957 | Vuncannon |
| 3,048,162 A | | 8/1962 | Gauss |
| 3,101,080 A | | 8/1963 | Lorbacher |
| 3,386,430 A | | 6/1968 | Linstead |
| 5,458,053 A | | 10/1995 | Hsiao |
| 5,884,554 A | | 3/1999 | Sprick |
| 5,983,882 A | | 11/1999 | Ceravolo |
| 2001/0017131 A1 | * | 8/2001 | Sim .......................... 126/25 A |

FOREIGN PATENT DOCUMENTS

| | | | | |
|---|---|---|---|---|
| JP | 8-80260 A | * | 3/1996 | ............... 126/25 A |
| JP | 8-336468 A | * | 12/1996 | ............... 126/25 A |

* cited by examiner

*Primary Examiner*—Sara Clarke
(74) *Attorney, Agent, or Firm*—Greer, Burns & Crain, LTD

(57) ABSTRACT

An improved barbecue that includes a pan having a floor and a plurality of side walls projecting generally normally from the floor, which is configured for supporting a heat source. The present barbecue also includes a removable grill dimensioned for placement within a space defined by the walls, at least one grill support rod pivotally engaged with the walls and having a grill support portion configured for receiving the grill, and an adjustment portion. Also included is a grill height adjustment mechanism mounted to the pan and configured for receiving the at least one adjustment portion and for effecting pivotal movement of the grill support portion for adjusting the height of the grill relative to the floor. The present barbecue provides an adjustment mechanism which simultaneously adjusts both ends of the grill, and which can be placed on a side wall of the barbecue rather than the bottom, resulting in more efficient use of space.

13 Claims, 3 Drawing Sheets

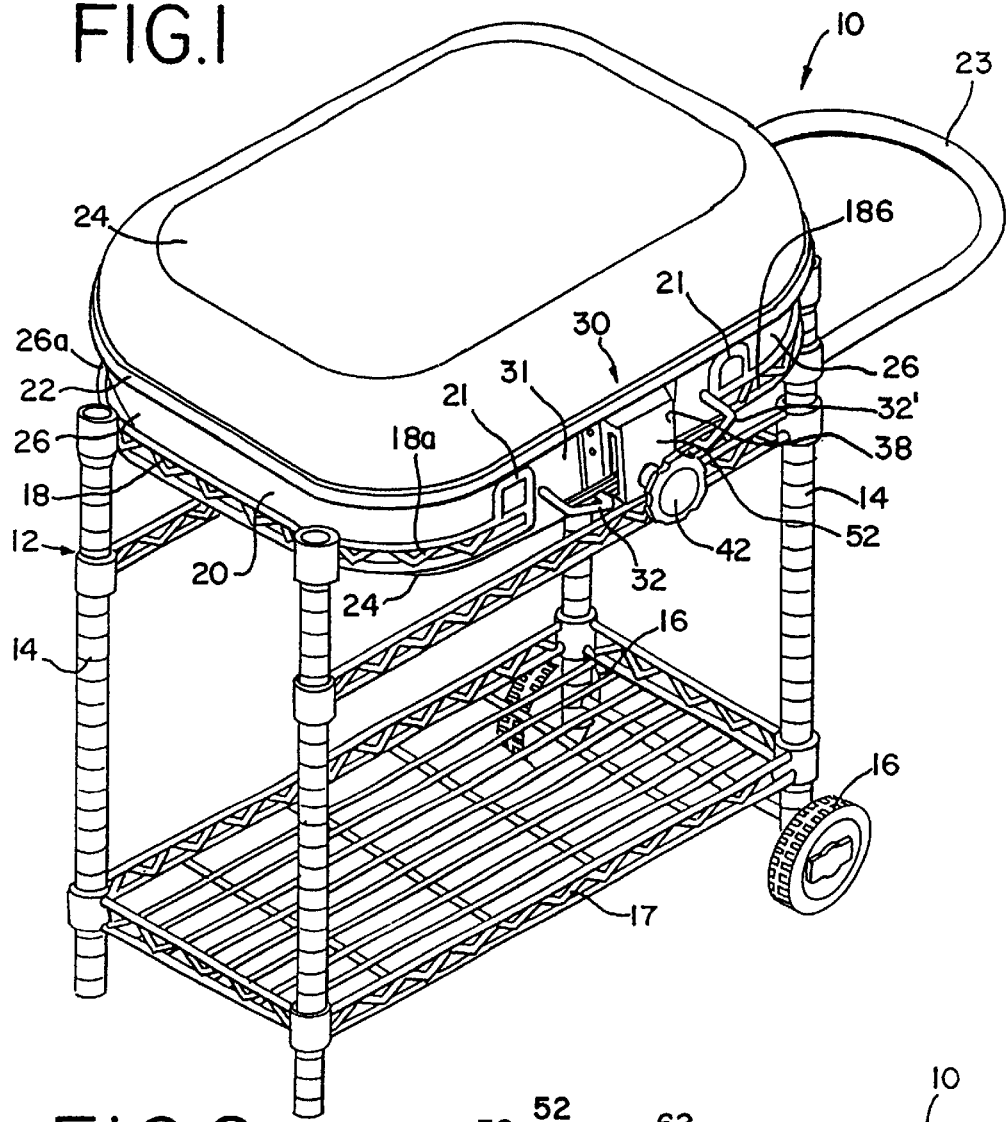
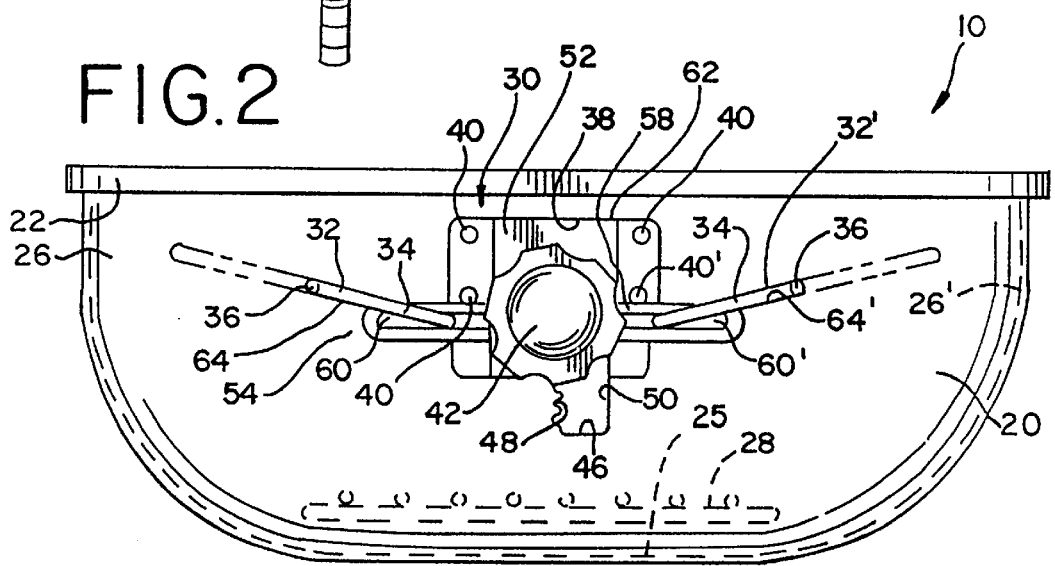

BARBECUE GRILL ADJUSTMENT MECHANISM

BACKGROUND OF THE INVENTION

The present invention relates to barbecues. More particularly, the present invention relates to barbecues having a grill height adjustment mechanism.

It is a common feature of barbecues to control the intensity of the heat source by adjusting the elevation of the cooking grill relative to the coals. This adjustability is a desirable feature, since it allows for higher or lower heat accommodating various types of food that need different cooking temperatures. Conventional barbecue cooking grill height adjustment mechanisms include levers for raising or lowering respective ends of a cooking grill. The levers engage saw-tooth brackets on the grill body. Often these levers are located below the lower pan or kettle portion of the grill, and are awkward to access and cumbersome to operate.

Another disadvantage of conventional barbecue cooking grill height adjustment mechanisms is that when two levers are provided, extra care must be taken to maintain a level position for the grill. Thus, both levers must be in the same notch on the corresponding bracket. This alignment process can be a tedious procedure.

Still another disadvantage of conventional barbecue cooking grill height adjustment mechanisms, is that the adjustment levers are biased into position as by a spring, and are often difficult to operate.

Accordingly, a first object of the present invention is to provide an improved barbecue cooking grill adjustment mechanism that allows the adjustment mechanism to be mounted on the side of the grill pan or kettle.

Another object of the present invention is to provide an improved barbecue having an adjustment mechanism that is simple and easy to operate.

Still another object of the present invention is to provide an improved barbecue cooking grill height mechanism having a single actuator for adjusting the entire grill.

BRIEF SUMMARY OF THE INVENTION

The above-listed objects are met or exceeded by the present improved barbecue, which features a cooking grill height adjustment mechanism mounted on the side of the barbecue, and which has a single knob for actuating the height adjustment. The present grill height adjustment mechanism is configured for effecting pivotal movement of a grill support portion for adjusting the height of the grill. The height of the grill is adjusted using a slotted bracket which engages a pair of pivotable grill support rods.

More specifically, the present invention provides a barbecue including a pan having a floor and a plurality of side walls projecting generally normally from the floor which supports a heat source, and also a removable grill dimensioned for placement within a space defined by the walls. In addition, the barbecue further includes one or more grill support rods pivotally engaged with the walls and having a grill support portion configured for receiving the grill, and an adjustment portion. Also included is a grill height adjustment mechanism mounted to the pan and configured for engaging the adjustment portion and for effecting pivotal movement of the grill support portion for adjusting the height of the grill relative to the floor.

BRIEF DESCRIPTION OF THE DRAWINGS

FIG. 1 is a perspective view of the present barbecue placed in a cart;

FIG. 2 is a front elevational view of the present barbecue with the adjustment mechanism attached on the side of the pan and showing the adjustment mechanism in a raised position;

DETAILED DESCRIPTION OF THE INVENTION

Figure 3:
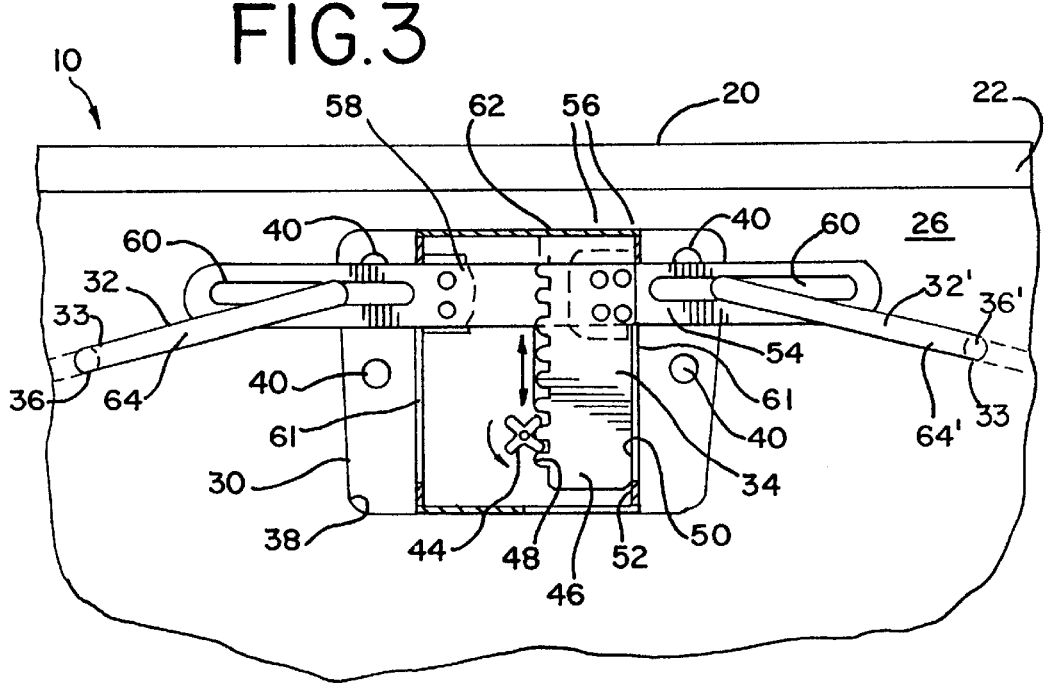
FIG. 3 is a fragmentary view of FIG. 2 with portions removed for clarity and showing the adjustment.

Referring now to FIG. 1, a barbecue generally designated 10, suitable for use with the present adjustment mechanism is shown mounted upon a barbecue cart 12. Details of the cart are described in copending, commonly assigned U.S. patent application Ser. No. 09/602,928 filed on Jun. 23, 2000, which is incorporated by reference. Generally speaking, the cart 12 preferably includes four legs 14, a pair of wheels 16 for mobility and a bottom tray 17 for storage. In addition, an upper bracket 18 secured to upper ends of the legs 14 has two 'C'-shaped portions 18a and 18b which each functionally engage a kettle or pan 20 of the barbecue 10. In the preferred embodiment, free ends of the brackets 18a, 18b are provided with rectangular standoffs 21 which engage an upper lip 22 of the pan for further support. A handle 23 is also provided at one end of the cart 12. However, other cart or leg configurations can also be used with the present barbecue 10, as are known in the art. Alternatively, the pan 20 may be mounted on a plurality of three or more legs, or on other types of carts, as are well known in the art.

A cover or lid 24 is provided and has a shape dimensioned so that it fits on top of the pan. The pan 20 has a floor 25 (shown more clearly in FIG. 2) supports a heat source such as charcoal briquettes (not shown), and side walls 26 projecting generally normally from the floor. Upon the floor 25 of the pan 20, a removable cooking grill hereinafter also referred to as a grill, 28 is provided, upon which the charcoal is preferably placed.

A grill height adjustment mechanism, generally designated 30, is preferably mounted to one of the side walls 26. Opposing free ends of the upper brackets 18a, 18b define a space 31 which accommodates the mechanism 30. Preferably, a pair of grill support rods 32 are connected to the adjustment mechanism 30 and are inserted through openings 33 the side wall 26 of the pan 20. Although only one end of the rods 32 is shown in FIGS. 1–4, it will be appreciated that opposing ends of the rods 32 are engaged in corresponding openings 33 in an opposing sidewall 26a (FIG. 5).

Figure 4:
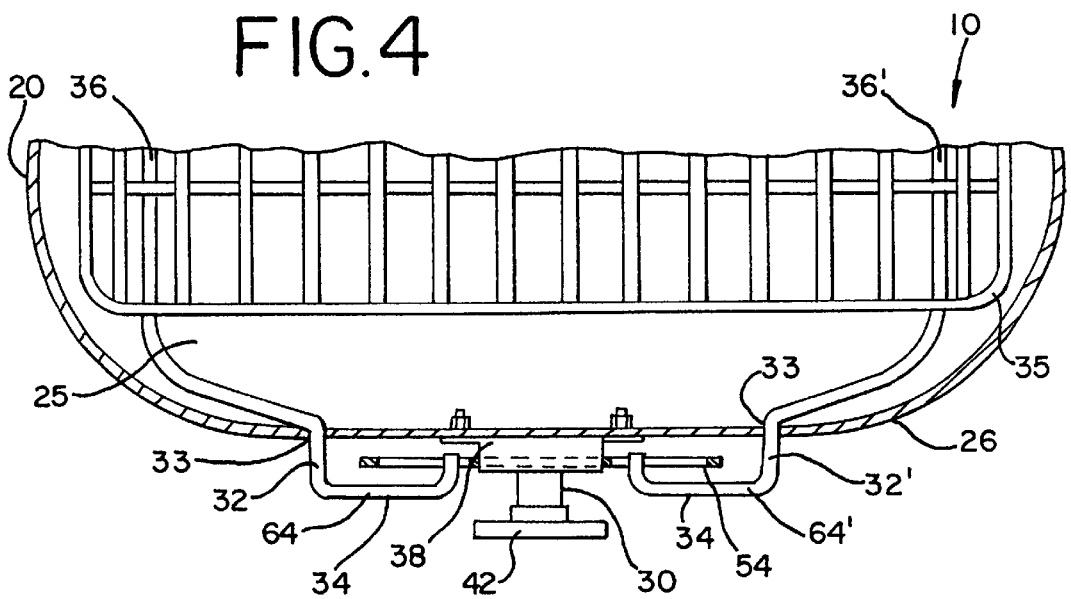
FIG. 4 is a fragmentary top view of the present barbecue depicting a grill placed within the pan and upon the present support rods.
Figure 5:
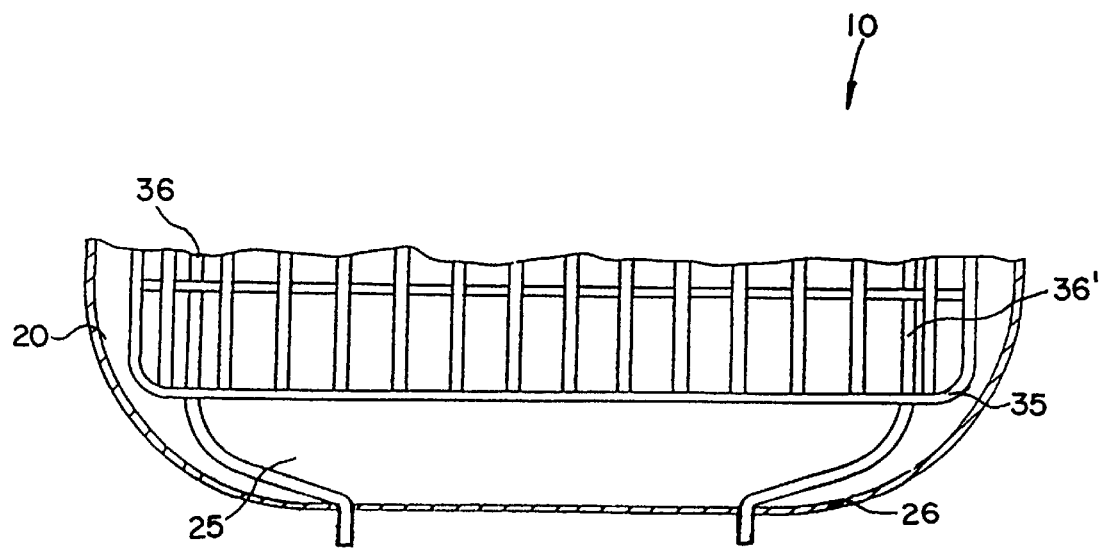
FIG. 5 is a fragmentary top view of the present barbecue showing the opposite end from that shown in FIG. 4.

The grill support rods 32 are configured to be pivotally engaged with the side walls 26, in the openings 33 and have an adjustment portion 34 and a grill support portion 36 for receiving a removable food supporting grill 35 (shown in FIG. 4). Furthermore, the grill support rods 32 are configured so that when the grill support portion 36 is in a raised position, the adjustment portion is in a lowered position and vice versa, meaning, alternatively, that the support portion is in a lowered portion when the adjustment portion 34 is in the raised position.

A pair of support rods 32, 32' are preferably included such that the adjustment mechanism 30 is configured for receiving both of the adjustment portions 34 from the rods and for effecting the movement of both adjustment portions simultaneously. The range of height adjustment of the grill support rods 32 is defined by the adjustment mechanism 30. While a pair of support rods 32 are preferred, it is contemplated that any number of support rods 32 can be employed depending on the application.

Turning to the grill height adjustment mechanism 30 shown more clearly in FIGS. 2 and 3, a housing 38 is used to mount the adjustment mechanism to the side wall 26. A plurality of openings 40, are provided on the housing 38 for securing the housing to the side wall 26 with threaded fasteners. Other fastening technologies, including welding, adhesives and rivets are also contemplated for securing the housing 38 to the side wall 26. A knob-like handle 42 is rotatably engaged on the housing 38. The handle 42 is connected to a pinion gear 44 inside the housing 38 (shown in FIG. 3). As the handle 42 is being rotated relative to the housing 38, the pinion gear 44 engages and vertically moves a toothed bar 46. As shown in FIG. 3, the toothed bar 46 has two edges, a first edge 48 and a second edge 50. The first edge 48 of the bar is the toothed side, and the second edge 50 is configured to slidingly engage an inner wall 52 of the housing 38. The direction of rotation of the handle 42 (clockwise, counter-clockwise) will determine the vertical linear direction of movement of the toothed bar 46 (upwards, downwards).

An elongated slotted bracket 54 is connected to the toothed bar 46. More specifically, the bracket 54 is mounted to the toothed bar by a plurality of threaded fasteners such as screws (not shown) which engage a like plurality of corresponding apertures 56 in the bar 46 and the bracket 54. On the opposite side of the housing 38, a guide bracket 58 is also fastened to the bracket 54 and serves as an additional sliding guide as the bracket moves vertically relative to the housing 38. In the preferred embodiment, the guide bracket 58 is also secured to the bracket 54 by threaded fasteners, however other fastening technologies are contemplated. The bracket 54 includes a pair of slots 60, 60'. It is also contemplated that the bracket 54 may be provided in two pieces for ease of assembly, and the pieces are held together by the guide bracket 58.

The pair of grill support rods 32, 32' are inserted into the open slots 60, 60' located oppositely on the bracket 54. Generally, the preferred embodiment includes an open slot 60 for every grill support rod 32. The bracket 54 is configured so that the slots, 60, 60' receive the adjustment portion 34 of each of the grill support rods 32, 32', however many there may be. As the toothed bar 46 moves linearly with the rotation of the pinion gear 44, the slotted bracket 54 similarly moves linearly in the vertical direction, which in turn, moves the pair of grill support rods 32, 32' that are inserted through the open slots 60, 60'. A slot 61 (shown in FIG. 3) is further found on each side of the housing 38 for accommodating the linear travel of the slotted bracket 54 between a raised position (FIG. 3) and a lowered position (FIG. 2). In addition, an upper edge 62 of the housing 38 serves as a stop member for limiting the upward movement of the bracket 54 relative to the housing.

Because the grill support rods 32, 32' moving along with the bracket 54 are configured to define the adjustment portions 34, 34' and the support portions 36, 36', the grill 35 disposed to rest upon the support portion also moves linearly in the vertical direction, resulting in the desired grill height adjustment. Consequently, the grill 35 is moved away from, or closer to, the heat source placed near the floor 24 of the pan 20 when needed by simply rotating the handle 40. More specifically, the adjustment mechanism 30 is configured so that the rotation of the handle 42 in a first direction, which preferably is clockwise, causes the bracket 54 to move from a raised position to a lowered position. Alternatively, the rotation of the handle 42 in a second, reverse or counter-clockwise direction causes the bracket 54 to move from a lowered position to a raised position.

Turning to FIG. 4, a top view of the present barbecue 10 is shown illustrating the adjustment mechanism 30 respective to the pan 20, the grill 35 and the grill support rods 32,32' is shown. The removable grill 35 rests upon the grill support portions 36, 36' of the rods 32, 32'. The support rods 32, 32' are configured so that front ends 64, 64' are inserted into the open slots 60, 60' of the bracket 54 extending into and through the pan 20.

Note that the adjustment mechanism 30 is placed on one of the side walls 26 of the pan 20, which allows for simpler construction of the barbecue 10. Furthermore, the side placement of the adjustment mechanism 30 provides more efficient use of space. In addition, because of the configuration of the adjustment mechanism 30, the grill support portion moves oppositely to the adjustment portion, allowing for a barbecue with a shorter profile.

While a particular embodiment of the improved barbecue grill adjustment mechanism has been shown and described, it will be appreciated by those skilled in the art that changes and modifications may be made thereto without departing from the invention in its broader aspects and as set forth in the following claims.

What is claimed is:

1. A barbecue comprising:
   a pan having a floor and a plurality of side walls projecting generally normally from said floor;
   said floor configured for supporting a heat source;
   a removable grill dimensioned for placement within a space defined by said walls;
   at least one support rod pivotally engaged with two of said walls, having a grill support portion configured for receiving said grill and an adjustment portion; and
   a grill height adjustment mechanism mounted to one of said walls of said pan, and configured for receiving said adjustment portion for effecting pivotal movement of said grill support portion relative to said side walls for adjusting the height of said grill relative to said floor, said adjustment portion being directly connected to said adjustment mechanism;
      wherein said adjustment mechanism is configured for vertically reciprocating said adjustment portion, and said at least one grill support rod is configured so that when said grill support portion is in a raised position, said adjustment portion is in a lowered position, and when said support portion is in a lowered position, said adjustment portion is in a raised position.

2. The barbecue according to claim 1 further including a pair of said grill support rods, and said adjustment mechanism is configured for receiving both of said adjustment portions and for effecting said movement of both said adjustment portions simultaneously.

3. The barbecue according to claim 1, wherein said adjustment mechanism further includes:
   a housing;
   a handle connected to a pinion gear and being rotatably engaged on said housing;
   a toothed bar having a plurality of linearly spaced teeth for engaging said pinion gear, so that rotation of said handle causes vertical movement of said bar; and
   an elongated slotted bracket connected to said toothed bar for movement therewith, and being configured for receiving said adjustment portion of each said grill support rod.

4. The barbecue according to claim 3 further including slots in said housing for accommodating linear travel of said slotted bracket between a raised position and a lowered position.

5. The barbecue according to claim 4 further including a stop member associated with said housing for limiting reciprocal movement of said bracket relative to housing.

6. The barbecue according to claim 4, wherein said adjustment mechanism is configured so that rotation of said handle in a first direction causes said bracket to move from a raised position to a lowered position, and rotation of said handle in a second, reverse direction, causes said bracket to move from a lowered position to a raised position.

7. The barbecue according to claim 3 further including a guide bracket attached to said slotted bracket for guiding the sliding action of said slotted bracket in said housing.

8. The barbecue according to claim 3, wherein said housing is fastened to one of said walls.

9. The barbecue according to claim 3, wherein said toothed bar has a first edge and a second edge, said first edge has said teeth, and said second edge is configured to slidingly engage an inner wall of said housing.

10. The barbecue according to claim 1 wherein said barbecue includes a lid.

11. An adjustment mechanism for adjusting a grill in a barbecue apparatus having at least one grill support rod with a grill support portion and an adjustment portion configured for receiving a grill, comprising:

a housing;

a handle connected to a pinion gear and being rotatably engaged on said housing;

a toothed bar having a plurality of linearly spaced teeth for engaging said pinion gear, so that rotation of said handle causes vertical movement of said bar; and an elongated slotted bracket connected to said toothed bar for movement therewith;

wherein said slotted bracket is configured for receiving and vertically reciprocating the adjustment portion, and said adjustment mechanism vertically reciprocates the adjustment position so that when said grill support portion is in a raised position, said adjustment portion is in a lowered position, and when said support portion is in a lowered position, said adjustment portion is in a raised position.

12. The mechanism according to claim 11 further including at least one grill support rod pivotally engaged with said slotted bracket and having a grill support portion configured for receiving a grill, and an adjustment portion; and wherein said elongated slotted bracket is configured for receiving said adjustment portion of said at least one grill support rod.

13. A barbecue comprising:

a pan having a floor and a plurality of side walls projecting generally normally from said floor;

said floor configured for supporting a heat source;

a removable grill dimensioned for placement within a space defined by said walls;

at least one support rod pivotally engaged with two of said walls, having a grill support portion configured for receiving said removable grill and an adjustment portion; and a grill height adjustment mechanism mounted to one of said walls of said pan, and configured for receiving said adjustment portion for effecting pivotal movement of said grill support portion relative to said side walls for adjusting the height of said grill relative to said floor, said adjustment mechanism comprising:

a housing;

a handle connected to a pinion gear and being rotatably engaged on said housing;

a toothed bar having a plurality of linearly spaced teeth for engaging said pinion gear, so that rotation of said handle causes vertical movement of said bar; and an elongated slotted bracket connected to said toothed bar for movement therewith, and being configured for receiving said adjustment portion of each said grill support rod;

wherein said adjustment mechanism is configured for vertically reciprocating said adjustment portion, and said at least one grill support rod is configured so that when said grill support portion is in a raised position, said adjustment portion is in a lowered position, and when said support portion is in a lowered position, said adjustment portion is in a raised position.

* * * * *